United States Patent [19]

Nakajima et al.

[11] 4,138,121
[45] Feb. 6, 1979

[54] TONE ARM ASSEMBLY

[75] Inventors: Heitaro Nakajima, Tokyo; Yoshimoto Omura, Mitaka; Isao Kawashima, Chiba, all of Japan

[73] Assignee: Sony Corporation, Tokyo, Japan

[21] Appl. No.: 790,047

[22] Filed: Apr. 22, 1977

[30] Foreign Application Priority Data

Apr. 28, 1976 [JP] Japan .................................. 51/48937

[51] Int. Cl.² .............................................. G11B 3/10
[52] U.S. Cl. ................................................. 274/23 R
[58] Field of Search ........................... 274/23 A, 23 R

[56] References Cited
U.S. PATENT DOCUMENTS

| 3,503,615 | 3/1970 | Matsuda | 274/9 RA |
| 3,572,724 | 3/1971 | Rabinow | 274/23 A |
| 3,830,505 | 8/1974 | Rabinow | 274/23 R |
| 4,046,386 | 9/1977 | Gosling et al. | 274/23 A |

Primary Examiner—Steven L. Stephan
Attorney, Agent, or Firm—Lewis H. Eslinger; Alvin Sinderbrand

[57] ABSTRACT

A tone arm assembly for record players having a first motor for rotating a tone arm in the vertical direction, a second motor for rotating the tone arm in the horizontal direction with respect to a record disc, respectively, a detector for detecting low frequency vertical and horizontal vibrations of the tone arm during the reproduction of a record disc and feeding back an output signal of the detector to the motors so as to cancel the vibrations, whereby high fidelity reproduction of sounds can be performed. Further, the stylus pressure adjustment and elevation angle adjustment of the tone arm are also performed.

23 Claims, 9 Drawing Figures

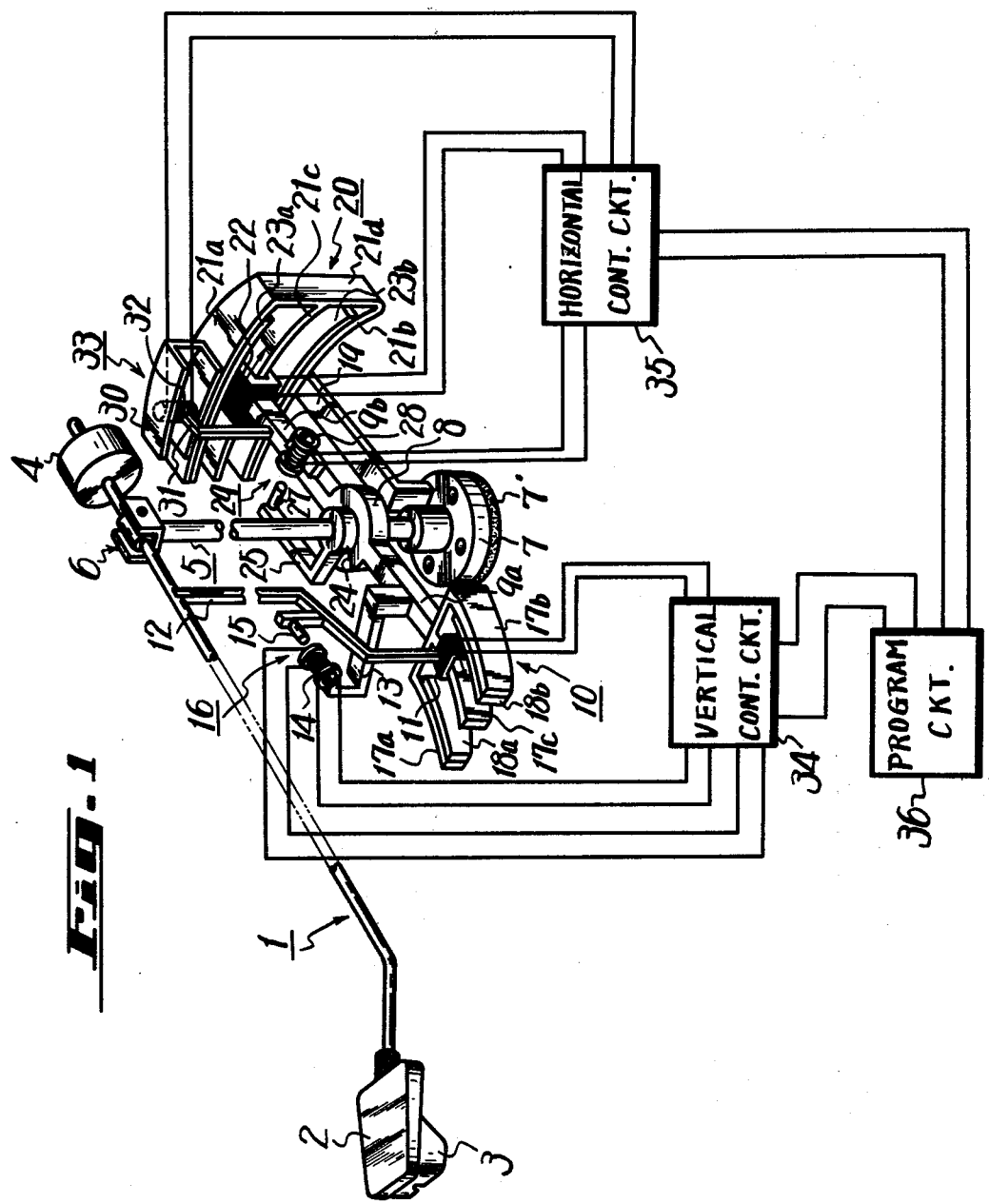

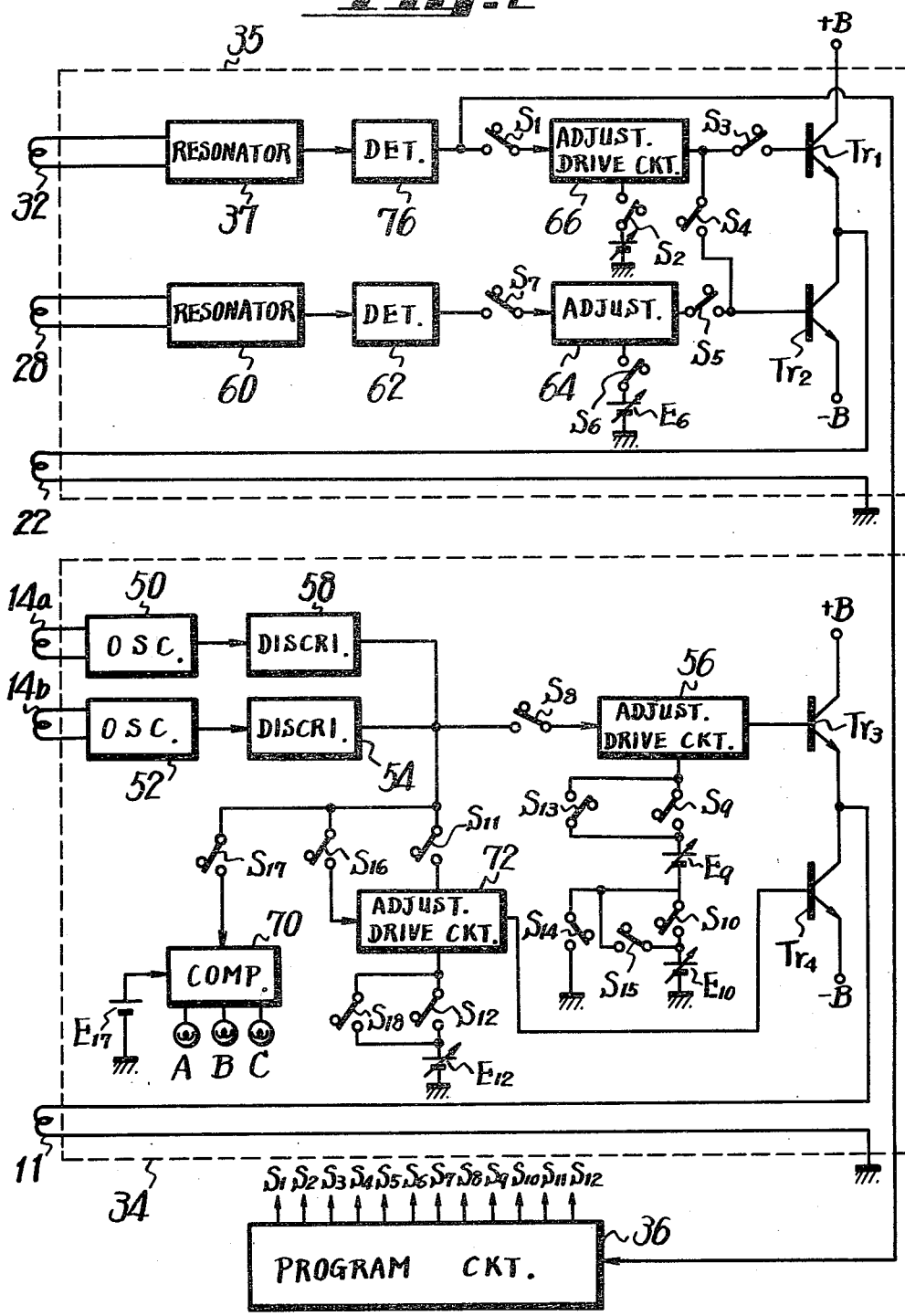

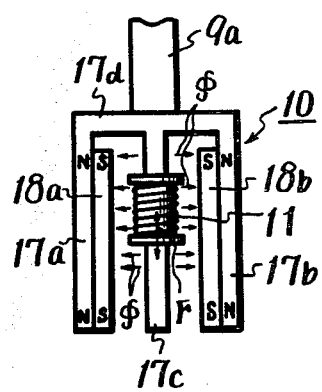
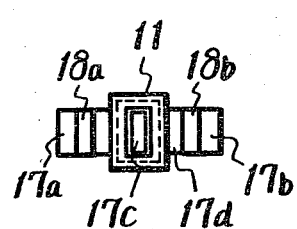
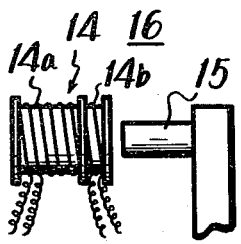
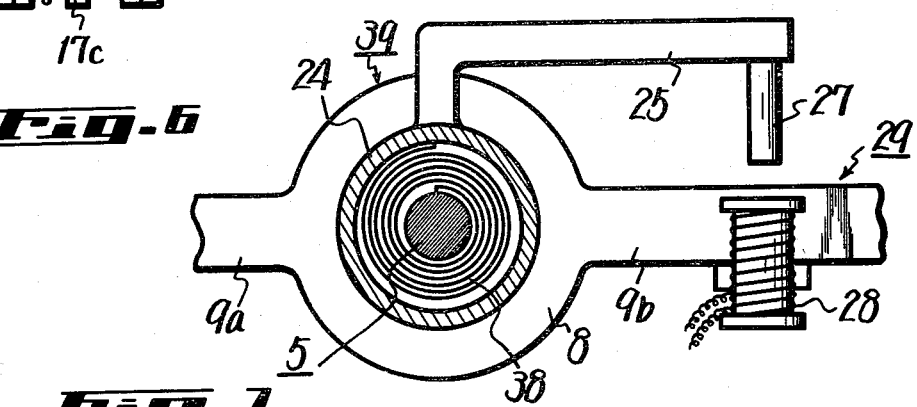
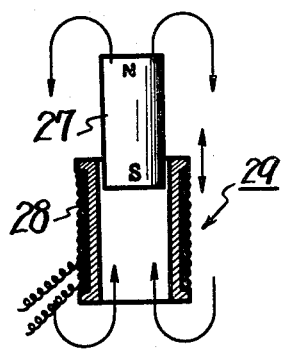
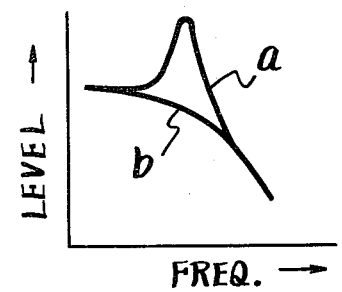
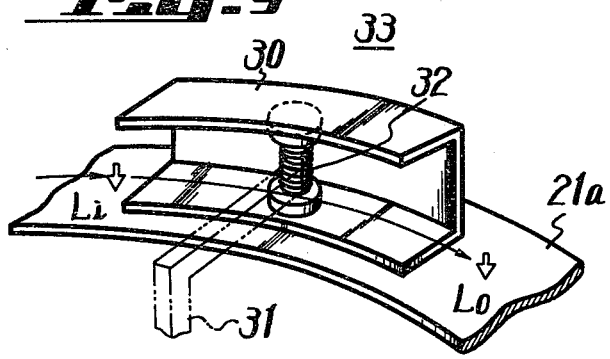

TONE ARM ASSEMBLY

BACKGROUND OF THE INVENTION

1. Field of the Invention

This invention relates generally to a tone arm assembly, and is directed more particularly to a novel tone arm assembly which is controlled with an electro-magnetic force.

2. Description of the Prior Art

In the recent development of phonograph record players, there is an effort to reproduce a signal from a record disc with high fidelity. In general a cartridge, which will trace the sound grooves of the record disc, is attached to a tone arm which is pivoted at its middle point. This tone arm is formed of a rigid pipe made of, for example, aluminium, so that when the stylus of the cartridge traces the grooves of the record disc, the tone arm is vibrated at a low frequency in the parallel (horizontal) and perpendicular (vertical) directions with respect to the plane of the record disc. This vibration is known as a low frequency resonance in the horizontal direction and a low frequency in the vertical direction, and the frequency of the resonance vibrations is on the order of 7 to 10 $H_z$. Such low frequency resonances of the tone arm act to add a modulation component to the signal reproduced by the cartridge, so that the prior art tone arm can not reproduce a sound signal from the record disc with high fidelity.

A tone arm assembly recently proposed is of the balanced type. That is, the tone arm is provided at its one end with a cartridge and at its other end with a counter weight, and in this case the counter weight is manually adjusted in accordance with the cartridge so that the stylus of the cartridge contacts the groove of a record disc at an optimum pressure. This adjustment is divided into adjustments of horizontal balance, zero balance and stylus pressure of the tone arm. In general, many of these adjustments are carried out by manually varying the position of the counter weight as described above. Since the above manual adjustment is rather troublesome, an adjustment by using electro-magnetic force is proposed in, for example, U.S. Pat. No. 3,830,505. According to this U.S. patent, an adjustment of a stylus pressure is possible but the concept of avoiding a low frequency resonance of a tone arm is not disclosed therein.

Further, since the groove of a record disc is spiral, in the case that the record disc is reproduced by a tone arm with an offset angle, an inside force is generated in the tone arm. Thus, an inside force canceller is provided in connection with the tone arm so as to cancel the inside force. In the art, many of the inside force canceller mechanisms are a coil spring, a lever and so on all of which utilize mechanical force, so that their accuracy is deteriorated over a long period of use of the tone arm.

OBJECTS AND SUMMARY OF THE INVENTION

An object of the invention is to provide a tone arm assembly free from the defects inherent to the prior art.

Another object of the invention is to provide a tone arm assembly which includes an electro-magnetic drive device for moving the tone arm in the horizontal direction, a circuit for detecting a low frequency resonance of the tone arm in the horizontal direction, and a circuit for feeding back the output of the detecting circuit to the drive device to thereby avoid the low frequency resonance in the horizontal direction.

A further object of the invention is to provide a tone arm aseembly which includes an electro magnetic drive device for moving the tone arm in the vertical direction, a circuit for detecting a low frequency resonance of the tone arm in the vertical direction, and a circuit for feeding back the output of the detecting circuit to the drive circuit to threby avoid the low frequency resonance in the vertical direction.

A further object of the invention is to provide a tone arm assembly in which an electro-magnetic drive device for avoiding a low frequency resonance of the tone arm in the vertical direction is used to easily carry out the horizontal balance, zero balance and stylus pressure adjustments of the tone arm.

A still further object of the invention is to provide a tone arm assembly in which an electro-magnetic drive device for avoiding a low frequency resonance of the tone arm in the horizontal direction is also used to perform an inside force cancellation operation for the tone arm.

A yet further object of the invention is to provide a tone arm assembly of an electronic control type in which lead-in and lead-out of the tone arm can be achieved automatically.

A still further object of the invention is to provide a tone arm assembly in which a linear motor is used as an electro magnetic drive device which is simple in construction and subject to less error in operation.

According to an aspect of the present invention there is provided a tone arm assembly which comprises a tone arm having a cartridge on one end thereof, an electromagnet device for moving said tone arm in the vertical and horizontal directions with respect to a record disc, a detecting circuit for detecting low frequency resonance generated by said tone arm during reproduction of said record disc and for generating output signals in response to said resonance, and a circuit for feeding back said output signals to said electro magnet device so as to cancel said low frequency vibrations resonance.

The other objects, features and advantages of the present invention will become apparent from the following description taken in conjunction with the accompanying drawings.

BRIEF DESCRIPTION OF THE DRAWINGS

FIG. 1 is a combined perspective and block diagram showing an example of the tone arm assembly according to the present invention;

FIG. 2 is a detailed block diagram showing a circuit used in the example shown in FIG. 1;

FIG. 3 is a top plan view of a linear motor which can be used in the tone arm assembly of the invention;

FIG. 4 is a front plan view of the linear motor shown in FIG. 3;

FIG. 5 is a schematic side plan view of a first detecting means which can be used in the tone arm assembly according to the invention;

FIG. 6 is a plan view, partially in cross-section, showing a low frequency resonance detector in the horizontal direction and a low pass filter;

FIG. 7 is a cross-sectional view of the low frequency resonance detector shown in FIG. 6;

FIG. 8 is a graph showing the frequency characteristics of the low frequency resonance detector shown in FIG. 6; and FIG. 9 is a schematic perspective view showing a second detector used in the example shown in FIG. 1.

DESCRIPTION OF THE PREFERRED EMBODIMENT

An example of the tone arm assembly according to the present invention will be hereinbelow described with reference to the drawings.

In FIG. 1 which shows an example of the tone arm assembly according to the present invention, 1 designates a tone arm. A head shell 2 with a cartridge 3 is attached to the front end of the tone arm 1. A counter weight 4 is fixed to the rear end of the tone arm 1 at a predetermined position or adjustably fixed to the rear end portion of the tone arm 1 at more than two predetermined positions. The manner to fix or adjustably fix the counter weight 4 is well known so that the description thereof will be omitted. The tone arm 1 is rotatably supported by a main shaft 5 at a supporting member 6. The supporting member 6 in the illustrated example is a pivot bearing in the horizontal direction and hence the tone arm 1 can be rotated only in the vertical direction at the pivot bearing 6. With respect to the rotation of the tone arm 1 in the horizontal direction, the tone arm 1 and the main shaft 5 are rotated in synchronized relation.

The main shaft 5 is supported in such a manner that, for example, its lower portion is inserted into a base body 7, which also serves as a bearing. A radial bearing, thrust bearing or the like is located in the base body 7 so as to support the main shaft 5 without any clearance. The base body 7 is attached through a damper sheet 7' or the like to a support which is not shown in FIG. 1 so as to adjust the up and down position or the height of the main shaft 5.

A hub 8 is fixed to the main shaft 5 between the support member 6 and the base body 7. Support levers 9a and 9b extend from the outer periphery of the hub 8 in the front and rear directions. A first linear motor 10 is provided at the free end of the front support lever 9a as an electro-magnet means for rotating the tone arm 1 in the vertical direction (the detailed construction of the linear motor 10 will be described later). A movable coil 11 of the linear motor 10 is attached to the free end of a coupling lever 12 which is extended from the tone arm 1 near its pivot point in the down-ward direction obliquely to convert the reciprocal movement of the movable coil 11 in the arrow direction to a rotation of the tone arm 1 in the vertical direction and hence to carry out various controls.

As one of control means, a detecting coil 14 is attached through a support piece 13 to the support lever 9a, and a core rod 15 made of, for example, ferrite is attached to the coupling lever 12 in opposed relation to the detecting coil 14 to form a detecting device 16 which will detect the vertical rotational position and vertical low frequency resonance (vibration) of the arm 1 by the relative relation of the coil 14 and core rod 15.

As shown in FIGS. 3 and 4, the first linear motor 10 consists mainly of an E-shaped yoke formed of side yokes 17a, 17b, a center yoke 17c, a connection member 17d (made of magnetic material) for connecting the yokes 17a, 17b, 17c and the coil 11 wound on the center yoke 17c. In this case, the cross-section of each of the yokes 17a, 17b and 17c is selected as a rectangular shape and the connecting member 17d is attached to the free end of the support lever 9a. Magnet bars 18a and 18b, which are magnetized as shown in FIG. 3, are attached to the inner surfaces of the side yokes 17a and 17b, and a bobbin with a rectangular aperture and a predetermined number of windings is movably inserted into the center yoke 17c as the movable coil 11 described previously. The current supplied to the movable coil 11 is controlled to reciprocally move the coil 11 in the direction indicated by an arrow F in FIG. 3. In FIG. 3, $\phi$ represents the direction of magnetic flux.

It may be, however, apparent that many variations of the linear motor could be made by one skilled in the art. For example, a U-shaped yoke can be used, with a movable coil movably provided on one of the arms of the U-shaped yoke, and a magnet bar is attached to its other arm. This linear motor exhibits substantially the same operation as the above linear motor 10. Further, it is also possible to close the open ends of the E- and U-shaped yokes by a magnetic material, or to select the extending direction of the respective yokes in the direction perpendicular to or inclined to the plane of the sheet of FIG. 3 instead of that shown in the example of FIG. 3. In conclusion, any linear motor can be used so as to rotate the tone arm 1 in the vertical direction through the coupling lever 12 (shown in FIG. 1) or other link mechanisms.

The respective yokes of the linear motor 10 used in the illustrated example are curved in the vertical plane along a circular arc with the pivot of the arm support member 6 as its center, and the axis of the detecting coil 14 is also curved to follow a circular arc with the pivot as its center. The reason thereof will be selfevident.

Turning back to FIG. 1, 19 designates a fixed arm which extends backwards from the base body 7 and on whose free end portion there is provided a second linear motor 20. The main operation of this second linear motor 20 is to rotate the tone arm 1 through the main shaft 5. The second linear motor 20 also has other various control functions described later. The second linear motor 20 is formed of upper and lower yokes 21a and 21b, a center yoke 21c, a connecting yoke 21d, movable coil 22 freely engaged with the center yoke 21c, and magnet bars 23a, 23b fixed to the inner surfaces of the upper and lower yokes 21a and 21b, similar to the first linear motor 10. In this case the movable coil 21 is attached to the free end of the rear support lever 9b. The respective yokes of the second linear motor 20 are curved in the horizontal plane along the circular arc with the center axis of the main shaft 5 as its center, and the movable coil 22 reciprocally moves in the direction shown by an arrow without contacting the center yoke 21c.

The second linear motor 20 carries out the horizontal position control of the tone arm 1 such as lead-in, lead-out, return and so on and also such controls to cancel the inside force and low frequency resonance (vibration) in the horizontal direction. As an example of means for detecting the low frequency resonance or its frequency (7 $H_z$ to 10 $H_z$), the following can be considered.

In FIGS. 1 and 6, 24 designates a rotational member made of a circular hollow body which surrounds the main shaft 5 an the hub 8. From the outer periphery of the rotational member 24 an arm 25 of, for example, L-shaped is extended in the backward direction, and a magnet rod 27 is planted on the free end of the arm 25 in the horizontal direction. A detecting coil 28 is attached to the support lever 9b in opposed relation to the magnet rod 27 such that the magnet rod 27 can be freely inserted into the coil 28 so as to form a low frequency resonance detector 29 which will be described later in detail.

As shown in FIG. 1, a yoke 30 whose cross-section is of U-shaped is mounted on the upper surface of the second linear motor 20, an inverse L-shaped rod 31 of rectangular cross-section is planted on the support lever 9b upwards, and a follower coil 32 with a core is attached to the free end of the horizontal portion of the rod 31. In this case, the coil 32 is located in the yoke 30 such that the both end faces of the core of the coil 32 are apart from the upper and lower inner faces of the yoke 30 by a small clearance and hence the coil 32 can be moved in the left and right directions, respectively. The inductance variation between the time when the coil 32 enters into the yoke 30 from the arm rest position and the time when the coil 32 leaves the yoke 30 in the right direction is detected and then the lead-in and lead-out positions of the tone arm 1 are determined. Accordingly, if the above detector 16 (which detects the vertical position of the tone arm 1) is taken as the first detector, the detecting device consisting of the yoke 30 and the follower coil 32 and detecting the horizontal position of the tone arm 1 can be taken as a second detector 33. In this case, both the yoke 30 and the core of the follower coil 32 are made of magnetic material with high magnetic permeability.

Circuit systems used for operating the tone arm of the aforedescribed mechanical construction are comprised of mainly a circuit 34 for moving the tone arm 1 in the vertical direction (which will be hereinafter referred to as a vertical control circuit), a circuit 35 for moving the tone arm 1 in the horizontal direction (which will be hereinafter referred to as a horizontal control circuit) and a program circuit 36. This system is shown in FIG. 1 as a block diagram which will be described later with reference to FIG. 2.

With reference to FIG. 5, the first detector 16 will be described. In this example, the detecting coil 14 includes a coil 14a for detecting the rotational position of the tone arm 1 in the vertical direction and a coil 14b for detecting the low frequency resonance in the vertical direction. Both coils 14a and 14b are wound on a hollow bobbin. As shown in FIG. 2, oscillators such as LC-oscillators 50 and 52 produce ascillating signals which are affected by the coils 14a, 14b whose inductances are varied in response to the relative position of the core rod 15 to the bobbin aperture of the coil 14. The oscillators included in vertical control circuit 34 further include a capacitor and a transistor to produce a high frequency signal.

When the tone arm 1 is subjected to a low frequency resonance (whose vertical components are about 7 $H_z$ to 10 $H_z$) upon tracing a sound groove of a record disc, the core rod 15 vibrates with a small amplitude near the coil 14b and hence the oscillation frequency of the LC-oscillator 52 is varied. This variation of oscillaton frequency of the oscillator 52 is converted to a voltage by a frequency discriminator 54 in the vertical control circuit 34. If this voltage from the frequency discriminator 54 is supplied through a switch $S_8$ and a drive circuit 56 to drive a transistor $Tr_3$, which is connected to the coil 11 of the first linear motor 10, the linear motor 10 will be controlled. That is transistor $Tr_3$ is driven to effectively feed back the discriminated signal so as to suppress the resonance frequency by correspondingly driving linear motor 10, whereby the low frequency resonance of the tone arm 1 in the vertical direction is suppressed.

When the cartridge 3 of the tone arm 1 is lifted from the plane of a record disc (not shown) by the first linear motor 10, the core 15 reaches a predetermined position in the coil 14a to change its inductance. As a result, the oscillation frequency from the LC-oscillator 50 is changed, and this frequency is converted into a corresponding voltage by a frequency discriminator 58. This discriminated voltage is supplied through the switch $S_8$ and the drive circuit 56 to the transistor $Tr_3$ to drive the same. Hence the current fed to the first linear motor 10 is controlled and the height position of the tone arm 1 or its rotational position in the vertical direction is held.

It is not always necessary to divide the detecting coil 14 into two coils 14a and 14b as shown in FIG. 5, but it is possible to use a single coil in place of two coils. However, if the coil 14b for detecting the low frequency resonance is selected shorter than the other coil 14a as shown in FIG. 5, the sensitivity of the coil 14b can be enhanced with respect the core rod 15.

FIGS. 6 and 7 are diagrams used for explaining the detector 29 for detecting the low frequency resonance of the tone arm 1 in the horizontal direction and also show a low pass filter 39. As described previously, in the illustrated example, the L-shaped arm 25 is extended from the outer periphery of the rotational member 24 which is made of a circular hollow body and engages with the main shaft 5. Magnet rod 27 is planted on the free end of the arm 25. The detector 29 for detecting the low frequency resonance of the tone arm 1 in the horizontal direction is formed of the magnet rod 27 and the detecting coil 28 mounted on the support lever 9. The range of the detecting frequency of the detector 29 is selected as 7 $H_z$ to 10 $H_z$ similar to the frequency range for the vertical direction. Thus, it is necessary to protect the detector 29 from external disturbance whose frequency is lower than the above detecting range.

To this end, as shown in FIG. 6, a coil spring 38 is provided between the main shaft 5 and the rotational member 24 such that the inner end of the coil spring 38 is fixed to the main shaft 5 and the outer end of the coil spring 38 is fixed to the inner wall of the rotational member 24, respectively. Further, an oil which has a suitable viscosity is charged into the clearance between the main shaft 5 and the rotational member 24 to prevent the above external disturbance of low frequency from being transmitted to the magnet rod 27. The above construction is the low pass filter indicated by 39.

If it is assumed that the inertial moment of the roatational member 24 including the arm 25 for magnet attachment is taken as J and the compliance of the coil spring 38 as C, there may occur a resonance by J and C, but in the invention this resonance is damped by the viscosity V of the coil to achieve the above operation.

In the graph of FIG. 8, a curve $a$ represents the resonance characteristic of J and C, and $b$ represents a damped curve by the viscosity V.

When the resonance frequency of J and C is selected lower than, for example, 1 $H_z$ and the tone arm 1 is subjected to resonance or vibration within the range of 7 $H_z$ to 10 $H_z$ when tracing a record groove, only the support levers 9a and 9b are made to follow this resonance or vibration. In other words, a relative position variation, which corresponds to the resonance frequency and amplitude of the tone arm 1, is provided between the magnet rod 27 and the detecting coil 28 of the detector 29.

The relation of the magnet rod 27 to the detecting coil 28 is shown in FIG. 7. By this arrangement of the magnet rod 27 and detecting coil 28, the magnetic flux through the coil 28 is varied when the relative position of the magnet rod 27 and coil 28 is changed. Thus, the output from a resonance circuit or resonator 60, to which the coil 28 is connected as shown in FIG. 2, is changed. The output of the resonator 60 is converted into a voltage by a detector 62, and then fed through a switch $S_7$, a drive circuit 64 and a switch $S_5$ to a transistor $Tr_2$. Coil 22 of the second linear motor 20 is connected to transistor $Tr_2$ such that the output of resonator 60 drives the transistor $Tr_2$ and hence controls the second linear motor 20. Thus, the feedback of the low frequency resonance of the tone arm 1 when it traces the sound groove to compensatingly drive linear motor 20 tends to avoid such low frequency resonance. That is, the resonance in the horizontal direction can be suppressed by the above feedback loop.

With reference to FIG. 9 the second detector 33 will be described. If the positions indicated by $L_i$ and $L_o$ at the left and right sides of the U-shaped yoke 30 are taken as the operation points of the lead-in and lead-out of the tone arm 1, respectively, the inductance of the follower coil 32 becomes maximum at the time when the coil 32 arrives at the position $L_i$ from the rest position upon tracing the sound groove. The output signal from a resonance circuit or resonator 37, to which the coil 32 of the second detector 33 is connected (refer to FIG. 2), is converted into a voltage by a detector 76, and then fed through a switch $S_1$, a drive circuit 66 and a switch $S_3$ to a transistor $Tr_1$, which is connected to the coil 22 of the motor 20 so as, to drive the transistor $Tr_1$. The voltage signal from the detector 76 is also fed to the program circuit 36 which then produces instruction signals $S_1, \ldots S_{12}$ for the vertical control circuit 34 and which also produces instruction signals for the horizontal control circuit 35. Thus, the first linear motor 10 is operated in accordance with these instruction signals to place the tone arm 1 or the stylus of the cartridge 3 in that lead-in position on the sound groove of the record disc. This brings the tone arm 1 to its trace state. As the tone arm 1 traces the sound groove of the record disc, the follower coil 32 travels within the yoke 30 to the right side. When the tone arm 1 arrives at the end of the sound groove, the follower coil 32 reaches the position $L_o$. Then, the tone arm 1 is lifted from the record disc by the linear motor 10 in response to the signal produced by the resonator 37, and under the control of the program circuit 36 and the vertical control circuit 34.

At this time, the horizontal control circuit 35 is supplied with the instruction signals from the program circuit 36 to drive the second linear motor 20 in the reverse direction. Thus, the tone arm 1 is returned to the rest position. The lead-in, lead-out and return operations can be carried out automatically, as will be described later.

The zero balance control, stylus pressure adjustment, cancellation of inside force and vertical tracking angle correction of the tone arm 1 will be described with reference to FIG. 2. Switches $S_1$ to $S_{12}$ shown in FIG. 2 are all electronic switches and controlled by the instruction signals $S_1$ to $S_{12}$ from the program circuit 36. Switches $S_{13}$ to $S_{18}$ are switches for adjusting the tone arm 1. If one of the switches $S_1$ and $S_{12}$ is turned ON or closed, all of the remaining ones of turned switches $S_1$ to $S_{12}$ are turned OFF or opened.

The adjustment of zero balance of the tone arm 1 will be now described. An adjusting means such as a variable voltage source $E_9$ is connected through the switch $S_{13}$ to the drive circuit 56. This voltage source $E_9$ is grounded through the switch $S_{14}$. The emitter of the transistor $Tr_3$ is grounded through the coil 11 of the linear motor 10. When the switches $S_{13}$ and $S_{14}$ are closed or turned ON, the bias, for example, to the transistor $Tr_3$ through the drive circuit 56 from the variable voltage source $E_9$ can be changed by changing the voltage of source $E_9$. Accordingly, the conductive state of the transistor $Tr_3$ is varied, and hence the current flowing through the coil 11 of the linear motor 10 is changed. When the current flowing through the coil 11 of the motor 10 is varied, the vertical position of the tone arm 1 is changed. That is, the zero balance of the tone arm 1 can be adjusted by adjusting the value of the adjusting means $E_9$.

The detection for the horizontal degree or position of the tone arm 1 will be now described. A series connection of the switch $S_{15}$ and a stylus pressure adjusting means such as a variable voltage source $E_{10}$ is connected in parallel to the switch $S_{14}$. A comparator circuit 70 for the tone arm 1 is connected through the switch $S_{17}$ to the output terminals of the discriminators 54 and 58. The comparator 70 also is connected with a reference voltage source $E_{17}$ and lamps A, B and C. When the switches $S_{13}$, $S_{15}$ and $S_{17}$ are closed (in this case the adjusting means $E_9$ and $E_{10}$ are assumed to be fixed), the transistor $Tr_3$ is driven by the output of the drive circuit 56 and hence current flows through the coil 11 of the motor 10. Thus, the output signal from the first detector 16 is supplied through the oscillators 50, 52, discriminators 58, 54 and the switch $S_{17}$ to the comparator 70 which compares the signal applied thereto with the voltage value of the reference voltage source $E_{17}$. If both the values are equal or the tone arm 1 is in its proper horizontal position, the lamp B is lit. If the tone arm 1 is inclined downward, the lamp A is lit, while if the tone arm 1 is inclined upwards, the lamp C is lit, respectively. Thus, a user can discriminate the horizontal position of the tone arm 1 by viewing which lamp is lit.

The stylus pressure and elevation angle adjustments of the tone arm 1 will be now described. A transistor $Tr_4$, which is connected to the coil 11 of the linear motor 10, is connected through a drive circuit 72 and the switch $S_{16}$ parallel to the switch $S_{17}$ to the output terminals of the discriminators 58 and 54. An adjusting means such as a variable voltage source $E_{12}$ is connected through a switch $S_{18}$ to the drive circuit 72. When the switches $S_{13}$, $S_{15}$, $S_{16}$ and $S_{18}$ are closed, the transistor $Tr_3$ is driven through the drive circuit 56 by adjusting the voltage source $E_{10}$. Thus, the tone arm 1 produces a stylus pressure in response to the voltage source $E_{10}$. When the adjusing means $E_{12}$ is varied thereafter, the bias for the transistor $Tr_4$ is varied through the drive circuit 72. As a result, the current flowing through the coil 11 of the linear motor 10 is changed and hence the vertical position of the tone arm 1 is controlled. As the value of the adjusting means $E_{12}$ increases, the elevation angle of the tone arm 1 also increases. However, the outputs of the discriminators 54 and 58 increase, since the output of the first detector 16 increases. The outputs from the discriminators 54 and 58 are fed to the drive circuit 72 through the switch $S_{16}$ to decrease the value of the adjusting means $E_{12}$. When both the outputs become coincident, the elevation angle of the tone arm 1 is determined.

The lead-in and lead-out operation of the tone arm 1 will be described. As shown in FIG. 9, the second detector 33 has the lead-in and lead-out positions $L_i$ and $L_o$. When the start switch (not shown) of the tone arm 1 is closed, the switches $S_9$, $S_{10}$, $S_{11}$ and $S_{12}$ shown in FIG. 2 are also closed. Thus the tone arm 1 is set at a predetermined elevation angle as described above. Then, the switches $S_3$ and $S_1$ are closed and hence the transistor $Tr_1$ is driven. Thus, current flows through the coil 22 of the linear motor 20, and then the tone arm 1 is moved in the horizontal direction such that the coil 32 arrives at the lead-in position $L_i$. When the coil 32 arrives at the lead-in position $L_i$, the inductance of the detector 33 increases. Thus, the output of the resonator 37 is changed, and this change is detected by the detector 76 whose output is fed to the program circuit 36. Then, this circuit 36 produces the signal to open the switch $S_1$, and hence the movement of the tone arm 1 is stopped. Further, the switches $S_{11}$ and $S_{12}$ are opened, so that the arm 1 is kept under such a state that its stylus is in contact with a record disc (not shown) at a predetermined pressure. Next, the switches $S_5$, $S_6$, $S_7$ and $S_8$ are closed to make the record player in playing state. At this time, the low frequency resonance of the tone arm 1 in the vertical direction is avoided by the fact that the transistor $Tr_3$ is driven through the oscillators 50, 52, the discriminators 58, 54 and the drive circuit 56 and hence the first linear motor 10 is controlled as described previously. The low frequency resonance in the horizontal direction is avoided by the fact that the transistor $Tr_2$ is driven through the resonator 60, detector 62 and drive circuit 64 and then the second linear motor 20 is controlled. When the tone arm 1 reaches the final position of the sound groove of the record disc, the coil 32 of the second detector 33 reaches the lead-out position $L_o$. At this time, the inductance of the coil 32 is changed which change is detected by the detector 76 through the resonator 37. A corresponding signal is supplied from the detector 76 to the program circuit 36. Thus, the switches $S_5$, $S_6$ and $S_7$ are opened. Thereafter, the switches $S_{11}$ and $S_{12}$ are closed and hence the tone arm 1 is lifted to a predetermined elevation angle. Then, the switch $S_3$ is opened while the switch $S_4$ is closed. Successively, the switches $S_1$ and $S_2$ are closed. As a result, the transistor $Tr_2$ is driven and the second linear motor 22 is moved in the direction reverse to the lead-in direction or in the lead-out direction to return the tone arm 1 to the rest position. When the stitches $S_1$ and $S_2$ are opened at this position, the arm 1 is stopped completely. Further, the switches $S_{11}$ and $S_{12}$ are opened and after the tone arm 1 is stopped, the switches $S_4$, $S_9$ and $S_{10}$ are opened. Thus, the operation of the tone arm 1 is completed.

During the interval within which the tone arm 1 reproduces the record disc, the inside force exerted on the tone arm 1 is cancelled. That is, the drive circuit 64 is provided through the switch $S_6$ with an adjusting means (variable voltage source) $E_6$ for cancelling the inside force. The bias for the transistor $Tr_2$ is varied through the drive circuit 64 by changing the voltage of the voltage source $E_6$, so that the inside force produced in the tone arm 1 during a play operation can be easily cancelled by controlling the linear motor 20 through the transistor $Tr_2$.

The above description is given on a single preferred embodiment of the tone arm assembly according to the present invention, but the main feature of the present invention resides in the provision of the electro-magnet means for rotating the tone arm, the control circuit for the means and the detector for detecting the low frequency resonance of the tone arm, in which the output signal from the detector is used to control the electro-magnet means and hence to control the electro-magnet means for substantially zero balance, the elevation angle and the stylus pressure of the tone arm.

It may be apparent that many modifications and variations could be effected by one skilled in the art without departing from the spirit or scope of the novel concepts of the present invention so that the scope of the invention should be determined by the appended claims.

We claim as our invention:

1. A tone arm assembly for controlling the tracing of a tone arm across a record disc and for preventing resonance of said tone arm, comprising a tone arm having a cartridge at one end thereof; first motor means mechanically coupled to said tone arm for moving said tone arm in the vertical direction with respect to said record disc; second motor means mechanically coupled to said tone arm for moving said tone arm in the horizontal direction with respect to said record disc; detecting means for detecting low frequency resonance in said tone arm in the vertical and horizontal directions as said tone arm traces said record disc; drive means coupled to said first and second motor means for supplying drive signals to said motor means to control the movements of said tone arm; and feedback means coupled to said detecting means for feeding back a vertical compensating signal to said drive means so as to compensatingly drive said first motor means in opposition to said detected low frequency resonance and thereby cancel said resonance in the vertical direction in said tone arm, and for feeding back a horizontal compensating signal to said drive means so as to compensatingly drive said second motor means in opposition to said detected low frequency resonance and thereby cancel said resonance in the horizontal direction in said tone arm.

2. A tone arm assembly as claimed in claim 1, wherein each of said first and second motor means is comprised of a coil and a permanent magnet.

3. A tone arm assembly according to claim 1 further comprising a shaft mechanically connected to said tone arm and rotating in the horizontal direction together with the movement of said tone arm, and first and second members mechanically connected to said shaft and each rotating therewith in the horizontal direction, wherein said first motor means is mounted on said first member and said second motor means is mounted on said second member.

4. A tone arm assembly as claimed in claim 3, wherein said first motor means comprises a permanent magnet rod connected to said first member and a coil mechanically coupled to said tone arm and positioned in a magnetic field of said permanent magnet, and said second motor means comprises a permanent magnet and a coil coupled to said second member and positioned in a magnetic field of said permanent magnet.

5. A tone arm assembly according to claim 2, further comprising a shaft rotated together with the movement of said tone arm in the horizontal direction, and lever means moved together with said shaft, said first and second motor means being mechanically coupled to said lever means, and said detecting means comprises first and second detectors, said first detector including a first member moved together with said tone arm in the vertical direction and a second member moved together with said shaft for sensing said first member; and said second detector including a first member moved together with said shaft and a second member for sensing said first member.

6. A tone arm assembly as claimed in claim 5, wherein said first motor means consists of a permanent magnet mechanically connected to said lever means and a coil located in a magnetic field of said permanent magnet, said coil being mechanically connected to said tone arm through an arm lever, the first member of said first detector being a magnetic piece mechanically connected to said arm lever, and said second member of said first detector being a coil mechanically connected to said lever means.

7. A tone arm assembly as claimed in claim 5, wherein said second motor comprises a permanent magnet and a coil which is mechanically connected to said lever means and positioned in a magnetic field of said permanent magnet, said first member of said second detector comprises a coil mechanically connected to said lever means, and said second member of said second detector comprises a magnetic piece which is connected to said shaft through a mechanical low pass filter.

8. A tone arm assembly as claimed in claim 5, wherein said lever means further comprises means for detecting lead-in and lead-out of said tone arm with respect to said record disc.

9. A tone arm assembly comprising: a tone arm having a cartridge at one end thereof and movable in vertical and horizontal directions with respect to a record disc; a shaft rotated together with the movement of said tone arm in the horizontal direction; lever means moved together with said shaft; first and second motors provided on said lever means, said first motor serving to move said tone arm in the vertical direction, said second motor serving to move said tone arm in the horizontal direction and comprising a permanent magnet and a coil which is mechanically connected to said lever means and positioned in a magnetic field of said permanent magnet; detecting means for detecting low frequency vibrations generated by said tone arm during reproduction of said record disc and for generating output signals in response to said vibrations, said detecting means comprising first and second detectors, said first detector having a first member moved together with said tone arm in the vertical direction and a second member moved together with said shaft, said second detector having a coil mechanically connected to said lever means and a magnetic piece which is connected to said shaft through a mechanical low pass filter, said mechanical low pass filter comprising a spring whose one end is fixed to said shaft and whose other end is fixed to said magnetic piece through an arm lever and feedback means for feeding back said output signals generated by said first and second detectors to control said first and second motors.

10. A tone arm assembly comprising: a tone arm having a cartridge at one end thereof; electro-magnet means for moving said tone arm in the vertical and horizontal directions with respect to a record disc, said electro-magnet means comprising a first motor for moving said tone arm in the vertical direction with respect to the record disc and a second motor for moving said tone arm in the horizontal direction with respect to the record disc; detecting means for detecting low frequency vibrations generated by said tone arm during reproduction of said record disc and for generating output signals in response to said vibrations, said detecting means comprising a first detector for detecting a low frequency vertical vibration of said tone arm and for generating a first output signal in response to said vertical vibration and a second detector for detecting a low frequency horizontal vibration of said tone arm and for generating a second output signal in response to said horizontal vibration, and each of said first and second motors including a drive circuit, and said first and second output signals being applied to the respective drive circuit so as to cancel each vibration.

11. A tone arm assembly as claimed in claim 10, wherein said first motor comprises a first drive circuit, a first transistor connected to said drive circuit and driving said first motor in one direction and a coil of said first motor connected to said transistor, and said tone arm assembly includes means connected to said first drive circuit to change the conduction state of said first transistor to thereby adjust the stylus pressure of said tone arm.

12. A tone arm assembly as claimed in claim 11, wherein said adjusting means includes means for adjusting a zero balance of said tone arm.

13. A tone arm assembly as claimed in claim 10, wherein said first motor comprises a second drive circuit and a second transistor connected to said first drive circuit and to said coil of said first motor for driving said first motor in the other direction, and said tone arm assembly comprises an adjust means connected to said second drive circuit for adjusting the angle of elevation of said tone arm.

14. A tone arm assembly as claimed in claim 13, wherein said second drive circuit is connected to said first detector, whereby said tone arm is balanced at a predetermined angle.

15. A tone arm assembly as claimed in claim 10, wherein said second motor includes a third drive circuit, a third transistor connected to said third drive circuit for driving said second motor in the one direction and a coil of said third motor connected to said third transistor, and said tone arm assembly further comprises an adjusting means connected to said third drive circuit for cancelling an inside force generated by said tone arm.

16. A tone arm assembly as claimed in claim 15, wherein said second motor includes a fourth drive circuit, a fourth transistor connected to said fourth drive circuit for driving said second motor in the other direction and said coil connected to said fourth transistor, and said tone arm assembly further comprises means for detecting a lead-in position of said tone arm and for generating an output signal to be supplied to said fourth drive circuit.

17. A tone arm assembly as claimed in claim 16, wherein said means detects a lead-out position of said tone arm for generating an output signal to be supplied to said third transistor.

18. A tone arm assembly as claimed in claim 10, wherein said first detector consists of a coil and a magnetic piece, and an oscillator and a discriminator for discriminating an output of said oscillator are connected between said coil and drive circuit.

19. A tone arm assembly as claimed in claim 10, wherein said second detector consists of a coil and a magnetic piece, and a resonator and a detector for detecting an output of said resonator are connected between said coil and drive circuit.

20. A tone arm assembly comprising a tone arm having a cartridge at one end thereof; a first motor coupled to said tone arm for moving said tone arm in the vertical direction with respect to a record disc; a second motor coupled to said tone arm for moving said tone arm in the horizontal direction with respect to said record disc; a first motor drive circuit connected to said first motor; a second motor drive circuit connected to said second motor; a first detector having a first element fixed in the vertical direction and a second element cooperable with said first element and mechanically coupled to and vertically movable with said tone arm for detecting the vertical position of said tone arm and for generating a corresponding control signal supplied to said first motor drive circuit so as to position said tone arm at a predetermined vertical angle; and a second detector having a first element fixed in the horizontal direction and a second element mechanically coupled to said tone arm and movable therewith in said horizontal direction, said last-mentioned first and second elements cooperating with each other to establish lead-in and lead-out sensing positions for detecting the respective lead-in and lead-out positions of said tone arm and for generating a corresponding control signal supplied to said second motor drive circuit so as to control the movement of said tone arm in the horizontal direction.

21. The tone arm assembly of claim 20 wherein each of said first and second motors is a linear motor having a coil mechanically coupled to said tone arm and a magnetic yoke about which said coil is wound.

22. The tone arm assembly of claim 21 wherein each of said motor drive circuits includes a source of electrical energy; a transistor for supplying said electrical energy to said coil; and means responsive to said control signal for controlling the conductivity of said transistor and thus the amount of electrical energy supplied to said coil.

23. The tone arm assembly of claim 22 wherein each of said detectors comprises a coil and a magnetic member movable with respect to said coil, said magnetic member being mechanically coupled to and movable with said tone arm so as to change the inductance characteristics of said coil, thereby generating said control signal.

* * * * *